Aug. 7, 1951  G. HERZOG  2,563,333
GEOPHYSICAL PROSPECTING USING GAMMA RAY DETECTORS
Filed March 9, 1948  4 Sheets-Sheet 1

INVENTOR.
GERHARD HERZOG
BY
Daniel Stryker
ATTORNEY

Aug. 7, 1951  G. HERZOG  2,563,333
GEOPHYSICAL PROSPECTING USING GAMMA RAY DETECTORS
Filed March 9, 1948  4 Sheets-Sheet 2
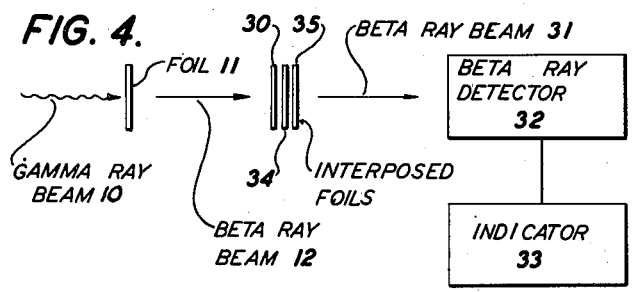
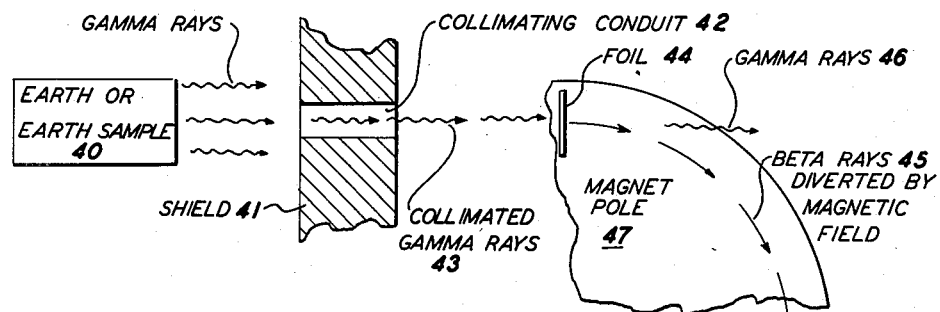
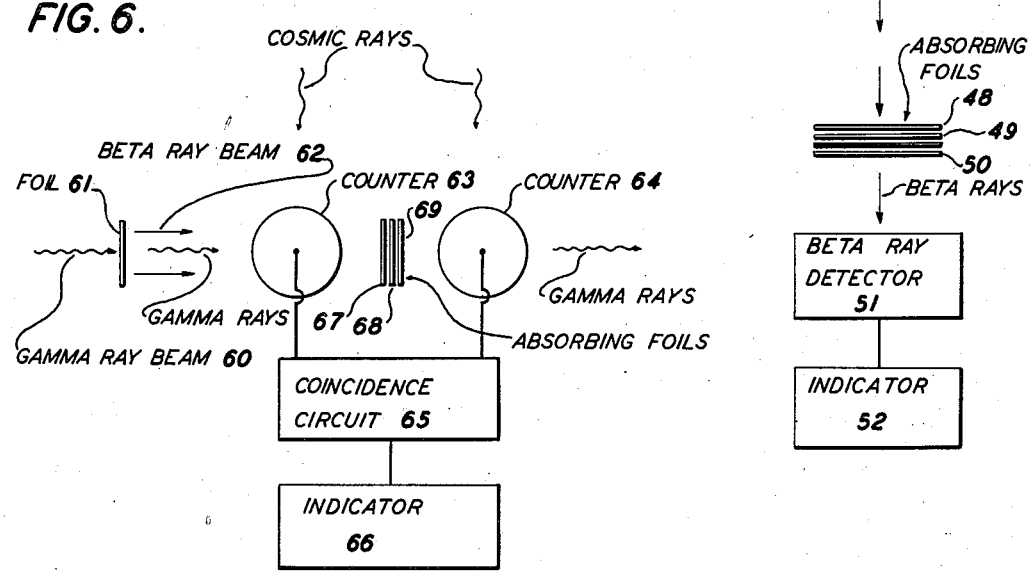
INVENTOR.
GERHARD HERZOG
BY
Daniel Stryker
ATTORNEY Aug. 7, 1951  G. HERZOG  2,563,333
GEOPHYSICAL PROSPECTING USING GAMMA RAY DETECTORS
Filed March 9, 1948  4 Sheets-Sheet 3

INVENTOR.
GERHARD HERZOG
BY
*Daniel Stryker*
ATTORNEY

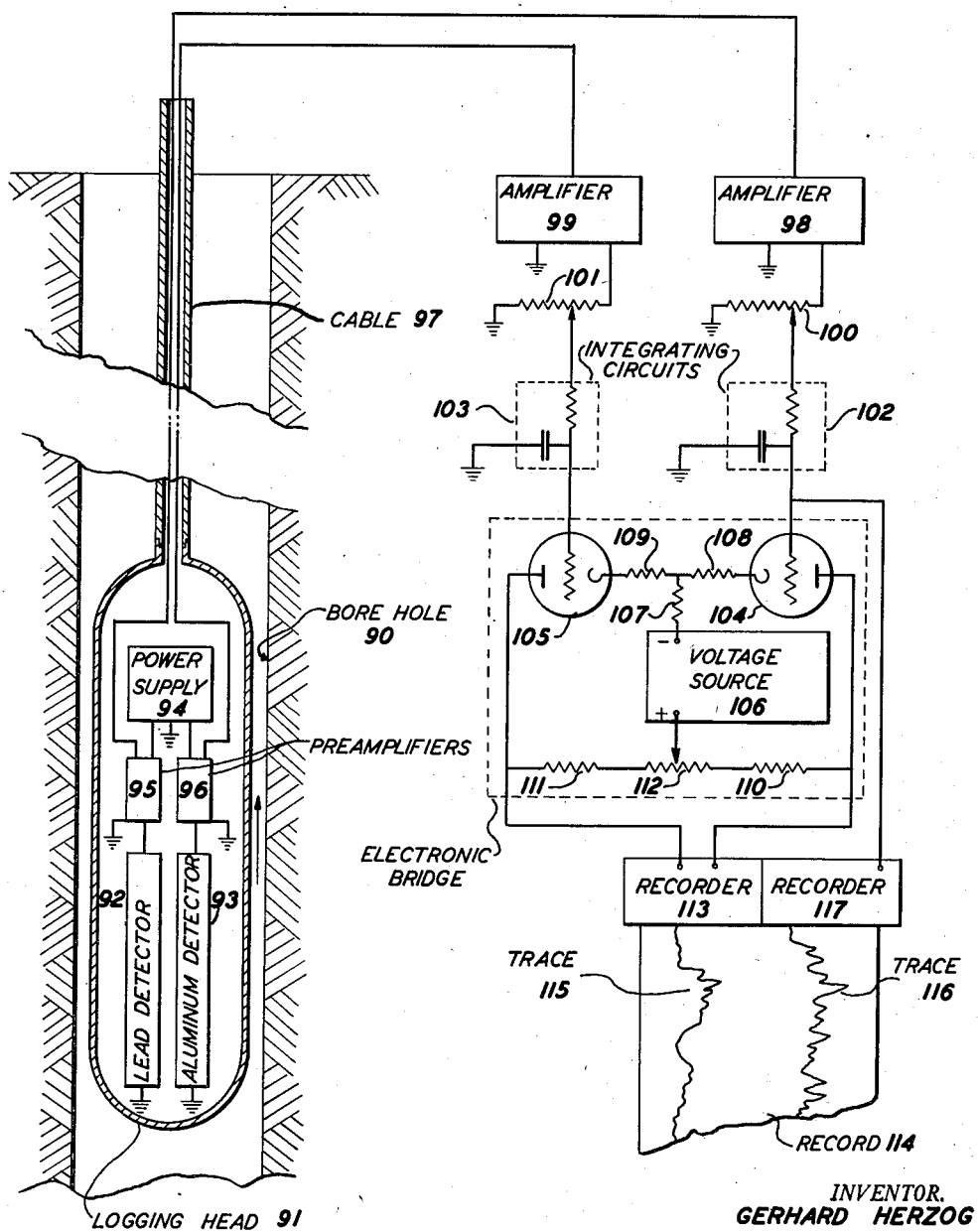

Patented Aug. 7, 1951

2,563,333

UNITED STATES PATENT OFFICE 2,563,333

GEOPHYSICAL PROSPECTING USING GAMMA-RAY DETECTORS

Gerhard Herzog, Houston, Tex., assignor to The Texas Company, New York, N. Y., a corporation of Delaware Application March 9, 1948, Serial No. 13,847

4 Claims. (Cl. 250—83.6)

This invention is concerned with geophysical prospecting, and particularly with prospecting operations involving the detection and measurement of gamma rays emitted by the earth or by earth samples. The invention finds application in the location of mineral deposits, but is of general utility in distinguishing between geological formations and in locating faults, contacts and other structural features of the earth. Thus it is useful in gamma ray logging of wells in oil field practice, in surface surveys made above ground for geological mapping purposes, and in underground surveys of mine workings.

As disclosed in my co-pending application, Serial No. 13,842, filed March 9, 1948, deeply buried mineral deposits may be located by surveys of gamma ray intensities along traverses that are so far removed from the deposit that gamma radiation if any, originating in the deposit itself is substantially completely absorbed in the overburden and makes no contribution to the intensity of gamma rays detected along the traverse. The deposit itself need not be radioactive and frequently is not, for the gamma rays which are detected and reveal the deposit appear to originate in an "aura" in the country rock or overburden. The process is primarily applicable to the discovery of deposits of minerals of non-radioactive metals, such as iron, copper, lead, zinc, gold, etc. By measuring gamma ray intensities at a number of spaced points along the traverse in the neighborhood of the deposit with sufficient accuracy, a radioactive anomaly which is a manifestation of the aura may be revealed, thus indirectly disclosing the presence of the mineral deposit. This anomaly may be either positive, in which case the intensity of gamma rays emitted by the country rock increases as the deposit is approached, or negative, in which case the intensity of gamma rays emitted by successive portions of the overburden decreases in the direction of the deposit. Such anomalies may be detected in accordance with the invention of my aforementioned application by measuring intensities of the rock or overburden in place, or as disclosed in co-pending application Serial No. 13,845, filed March 9, 1948, by Herzog, Stratford and Teichmann, such anomalies may be detected by taking samples of rock from different points in the country rock, and accurately determining the intensity of gamma rays emitted by the samples after their isolation from the mass in which they occur.

In accordance with the instant invention, which may be employed alone or in conjunction with the methods of the aforementioned co-pending applications, the spectrum of the gamma radiation emitted by rocks or rock samples is investigated. Thus, the spectra of gamma radiation emitted at a series of locations along an earth surface, either above or underground, may be analyzed, or a series of samples may be taken at these locations and the gamma ray spectra of the several samples subjected to analysis with the samples removed from the main mass and preferably isolated in a space in which "background" radiation (i. e. that emitted by other than the sample) is as low and as uniform as practical.

Gamma radiation consists of electromagnetic waves, identical in nature to very penetrating X-rays. Gamma rays are emitted with different individual energies, i. e. wave length, and each radioactive substance has a characteristic gamma ray spectrum composed of gamma radiation of various wave lengths (energies). Hereinafter gamma ray beams are referred to as "monochromatic" when they consist of rays of a single energy and as "polychromatic," when they consist of rays of different energies.

In the practice of the invention (say to distinguish between the gamma spectra emitted by two different rock formations, and thereby establish the line of contact between them) any of the known means for experimental determination of gamma ray spectra may be employed, including crystal spectrometers, the use of photoelectric effect in a Wilson cloud chamber, or measurement of the Compton effect. However, for reasons of simplicity I prefer to produce beta radiations from gamma radiation, say by permitting the gamma radiation to impinge on a thin metal foil, and then investigate the energy distribution of the beta radiation thus produced, or better still to investigate the gamma spectrum by employing a plurality of detectors which have different sensitivities for gamma rays at various energy levels. These and other aspects of my invention will be more thoroughly understood in the light of the following detailed description, taken in conjunction with the accompanying drawings in which:

Fig. 4 is a diagram illustrating another means of analysis of energy of beta radiation derived from gamma radiation which is the real subject of investigation;

Fig. 5 illustrates an improved form of the apparatus of Fig. 4;

Fig. 6 illustrates a further modification of the apparatus of Fig. 4 employing a coincidence circuit;

Fig. 9 is a schematic diagram of a well logging apparatus constructed on the same principles as the apparatus of Fig. 7.

Figure 1:
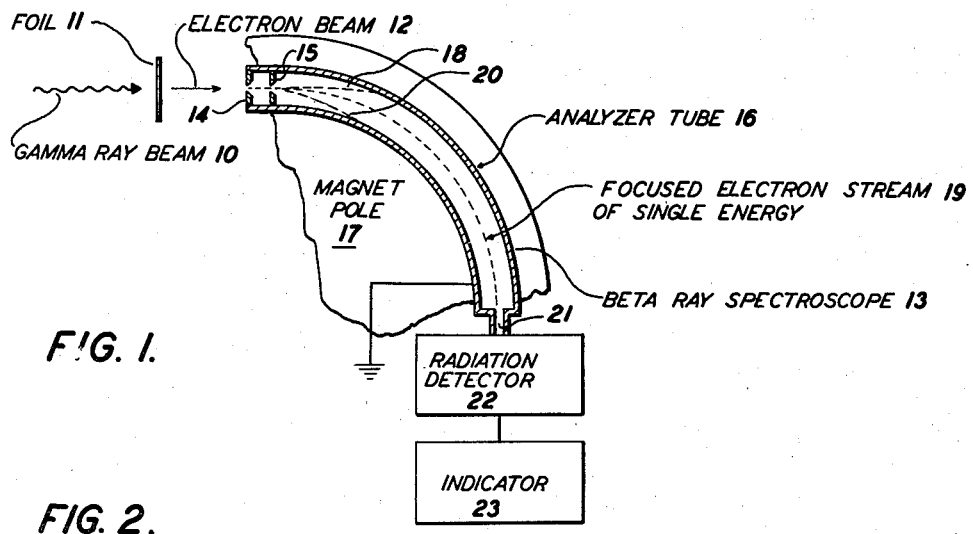
Fig. 1 is a diagram illustrating a practice of the invention employing a beta ray spectrometer to analyze indirectly a gamma ray spectrum.

Referring to Fig. 1, a "polychromatic" gamma ray beam 10 (i. e. a beam having rays of different energies) from an earth mass or an earth sample is caused to impinge on a thin metal foil 11 which thereupon emits an electron beam 12. This electron or beta ray beam is directed into a beta ray spectroscope 13 of conventional design, equipped with collimating plates 14, 15 having slits through which the electron beam enters an analyzer chamber or tube 16. This chamber is disposed between the poles of an electromagnet, one pole 17 being shown. The magnetic lines of force are perpendicular to the plane of the drawing. Under the influence of the magnetic field the electrons of the beam are caused to pursue curved paths 18, 19, 20, the radii of curvature being dependent upon the energy of the electrons and the strength of the magnetic field. By changing the field force, for example by changing the energization of the electromagnet, streams of electrons having different energies may be focused successively on an outlet 21 at the end of the analyzer tube and thus pass to a radiation detection apparatus 22, for example a conventional Geiger-Mueller counter, equipped with means 23 for indicating the abundance of the electrons in the stream focused on the outlet. The unfocused streams, say the streams 18, 20, strike the wall of the analyzer and are grounded. Each stream of electrons is composed of electrons of the same energy and each may be focused on the outlet until a fixed number of pulses, say 1000, has been registered by the detection apparatus, the time for this count being accurately determined. The number of counts divided by the time is a measure of the abundance or intensity of electrons of a given energy. The operation is repeated with a series of different magnetic field strengths, so as to bring into focus a corresponding series of electron streams, each of a different energy, and in this way the intensity of the electrons of each energy is determined.

Figure 2:
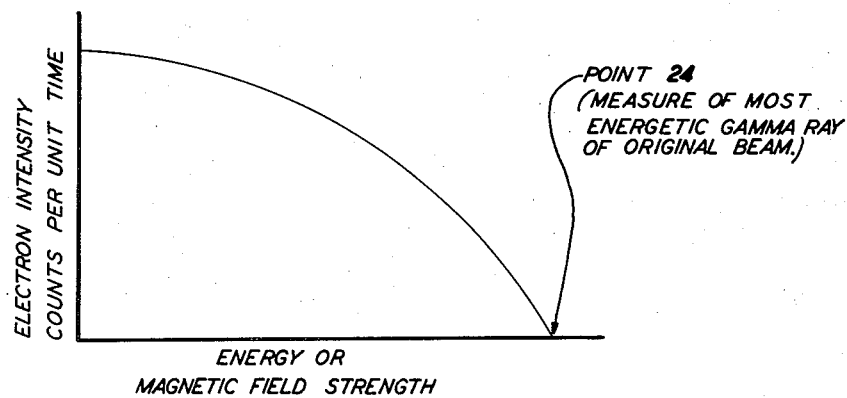
Fig. 2 is a graph of intensity against energy derived in the operation of the apparatus of Fig. 1.

Fig. 2 is a plot of the results of a spectrum analysis conducted as described above with energy (of which magnetic field strength is a measure) plotted as abscissa and abundance, or electrons detected per unit time (intensity) as ordinate.

Assuming no loss of energy except binding energy in the production of electrons by the gamma ray beam, i. e. a very thin foil 11, the curve of Fig. 2 would represent the actual spectrum, i. e. energy distribution of the gamma ray beam being analyzed. However, with foils of presently obtainable thickness, a given gamma ray may produce an electron which, after emergence from the foil, can have any energy from zero to the maximum indicated by the curve at the point 24 where it strokes the abscissa. The end point 24, however, is always a measure of the energy of the hardest gamma ray contained in the original "polychromatic" beam, and the shape of the curve obtained in the spectrum analysis conducted as described above may be used to compare energy distribution in two different gamma ray beams.

Figure 3:
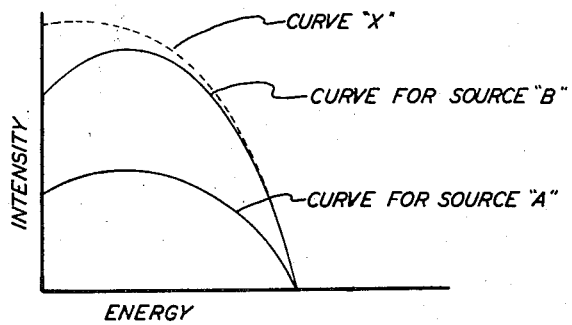
Fig. 3 is a graph similar to Fig. 2 showing several types of curves derived with the apparatus of Fig. 1.

To take a simple case of comparison, two similar sources of radiation, one twice the size of the other will give two curves with the same endpoint and the same shape, except that the curve representative of the bigger source will have twice the amplitude of the curve representative of the other source. This is illustrated by Fig. 3 upon which have been plotted the curves for two sources A and B, the source B being twice as powerful as A but with the same energy distribution. Any deviation from the relationship of the two curves as expressed above would mean that the two sources had different spectra. In other words, by comparing the shape of the curves produced from the results of analyses with the apparatus of Fig. 1 of two different rock samples, it is possible to determine qualitatively which sample emits the highest proportion of soft rays, and by mathematical analysis it is possible to compare the two spectra quantitatively. The curve "X" on Fig. 3 is representative of a gamma ray beam having a higher proportion of "soft" rays, i. e. rays of low energy, than the gamma ray beams from sources "A" and "B."

In accordance with the invention, a series of rock samples may be taken at spaced known locations along a traverse being investigated, say along a crosscut in a mine or above ground along a surface below which it is suspected that an ore body occurs. Each sample is reduced to equal size after crushing and each is then subjected to spectrum analysis with the apparatus of Fig. 1, i. e. by employing the gamma radiation to produce beta radiation, and subjecting the beam of beta radiation to spectroscopic analysis. Alternatively, the apparatus may be moved from one location to another along the traverse and the spectra of the gamma radiation emitted from the earth at each location investigated. In either case, a difference in spectra from sample to sample or from location to location may be significant in determining the presence of a radioactive anomaly which could not be detected by a comparison of the intensity of gamma rays emitted by the several samples or from the several locations.

The apparatus of Fig. 4 illustrates another system for investigating the energy distribution of a gamma ray beam emitted by an earth formation or earth sample. As in the case of Fig. 1, the polychromatic gamma ray beam 10 to be investigated is caused to impinge on the thin foil 11 with resultant emission of a beta ray beam 12 (electrons). The electron beam in turn impinges on another thin foil 30 which has sufficient absorptive power to stop electrons of relatively low energy, but permitting beta rays of greater penetration (energy) to pass through as a beam 31 to a detector 32 sensitive to beta radiation, say a Geiger-Mueller counter, the response of which is registered by a conventional indicating means 33. The intensity of the beta radiation thus detected is determined in terms of counts of the detector per unit time. The operation is repeated with an additional foil 34 interposed in the path of the beta rays and again with a third foil 35 interposed. Additional foils are added to the stack until the beta radiation is substantially blocked. The total foil thickness for each determination of beta ray intensity is then plotted against the intensity corresponding to that thickness. Foil thickness in this case is a measure of energy, so that if it is plotted as abscissa with intensity as ordinate a curve generally similar to that of Fig. 2 is obtained. This curve may be interpreted in the same ways as Figs. 2 and 3. Thus gamma ray beams may be compared with respect to energy distribution The interposed foils on the apparatus of Fig. 4 must be shielded or otherwise protected from the gamma ray beam, which otherwise will produce new electrons by impingement on these foils and vitiate spectrum determination. One means for protecting the foils from this gamma radiation is illustrated in Fig. 5, wherein gamma rays from an earth mass or earth sample 40 impinge on a shield 41 of lead having an orifice or collimating conduit 42 through which a gamma ray beam 43 passes. A thin foil 44 is disposed in the path of the collimated gamma ray beam, which impinges on the foil and produces a stream 45 of electrons (beta radiation). Some gamma rays 46 are not converted to beta radiation and these continue beyond the foil in the general direction determined by the collimating conduit. The stream of electrons is diverted from this direction by a magnetic field the lines of force of which are perpendicular to the plane of the paper and are produced by a magnet, one pole 47 of which is shown. The electrons thus pursue a curved path which carries them to the stack of absorbing foils 48, 49, 50. Those electrons passing through the absorbing foils are intercepted by a conventional beta ray detector 51 equipped with a conventional indicator 52, which registers the intensity of the detected radiation, i. e. the counts per unit time.

The operation of the apparatus of Fig. 5 is the same as that of Fig. 4, and a similar plot of foil thickness against intensity may be obtained.

Another apparatus for avoiding the effect of new electrons produced by impingement of gamma radiation on the absorption foils is shown schematically in Fig. 6, wherein a gamma ray beam 60 emitted by a rock formation after collimation impinges on a thin foil 61 with resultant emission of beta rays 62. The beta radiation thus formed, together with unconverted gamma radiation passes as a beam which is intercepted by a pair of beta ray counters 63, 64 such as Geiger-Mueller detectors. These counters are connected together through a conventional coincidence circuit 65, which may include amplifiers etc., in addition to the coincidence circuit proper. Such circuits are known and are disclosed for example at page 44 of "Radioactivity and Nuclear Physics," by Cork (van Nostrand 1947). The output of the coincidence circuit is connected to conventional indicating or recording means 66. The construction of the coincidence circuit is such that only those individual rays are counted which are detected simultaneously by both counters.

A set of absorber foils 67, 68, 69 is interposed between the two counters one after another to increase foil thickness in steps, just as in the apparatus of Figs. 4 or 5.

The operation of the apparatus of Fig. 6 is as follows:

The thickness of absorbing foil is increased progressively and after each increase the registered beta ray intensity, as determined by the coincidence arrangement, is measured, for example in terms of counts or pulses per minute. Foil thickness is plotted against corresponding intensity to produce a curve similar to that of Fig. 2, the interpretation of the results represented by the curve or curves being made as described in relation to Figs. 1, 2 and 3.

Gamma radiation, even though it passes through the foil 61 to the beta ray detectors and the absorbing foils does not vitiate the results obtained through production of new electrons in the absorbing foils. Such a new electron, if it passes to the counter 64, produces a count which is not accompanied by a simultaneous count of the counter 63 and so is not registered. Should the new electron from the absorbing foil be reflected and detected by the counter 63 it will not register since the two counters do not trip simultaneously. If an original electron from the foil 61 is stopped by the absorbing foils it may be detected by the near counter 63 but will not be detected by the far counter 64. Consequently the only electrons which are registered are original ones from the foil 61 which are detected by the near counter, pass through the absorbing foil or foils and are detected by the far counter. As absorbing foil thickness is increased the abundance of such electrons decreases and the registered intensity drops.

The apparatus of Fig. 6 has another advantage in that it eliminates the effects of cosmic ray components, say penetrating particles such as mesotrons, against which it is impractical to shield the detectors or counters. Assuming that the cosmic radiation is directed from above in Fig. 6, which is easily arranged by proper orientation of the instrument, a penetrating particle which trips one counter will not trip the other and so, by reason of the coincidence circuit, will not be registered.

Figure 7:
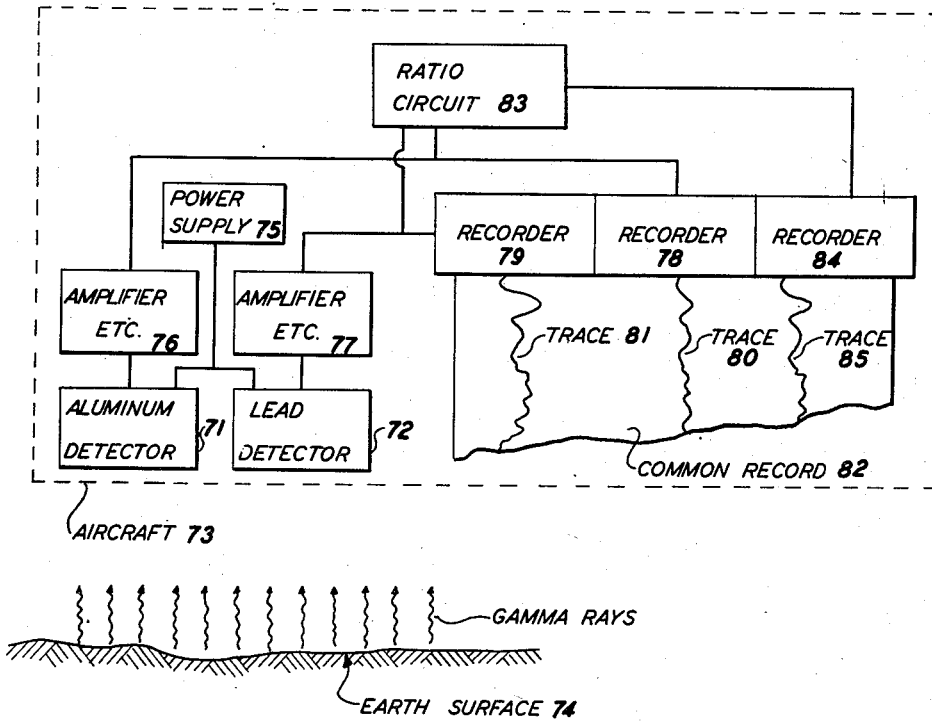
Fig. 7 is a block diagram illustrating an aerial survey made in accordance with the invention employing airborne gamma ray detectors of different metals and having different relationships between detection efficiency and energy of gamma radiation over a substantial range of such energy.
Figure 8:
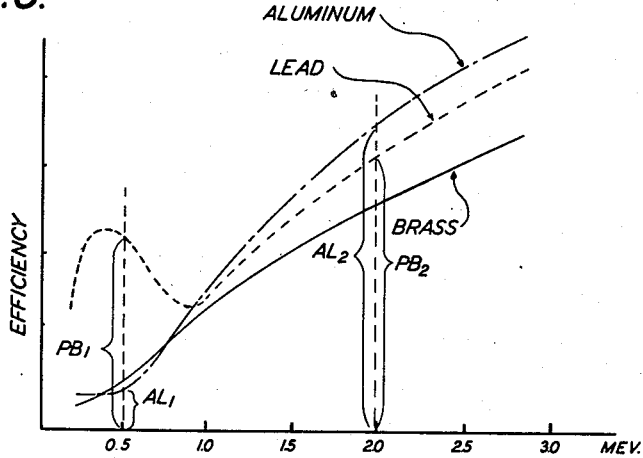
Fig. 8 is a graph showing the relationship of detection efficiency to energy of the gamma rays detected for detectors of different metals.

The practice of the invention, as illustrated by Figs. 1 through 6 involves producing beta radiation as the result of the action of the gamma radiation which is the real subject of interest, and the investigation of the energy distribution of the electrons thus formed. Figs. 7 and 8 illustrate another approach which is somewhat more direct. In this aspect of the invention, the distribution of energy in gamma radiation from earth or earth sample is investigated by simultaneously detecting such radiation from a substantially common origin, with two detectors, the efficiencies of which change in different proportions as the energy level of the gamma radiation is changed. For example, two such detectors disposed side by side or at least substantially adjacent each other so that they are subjected simultaneously to radiation from a common source may be drawn up a bore hole in the earth or flown or carried along a traverse above ground within range of gamma radiation therefrom. The output of each detector is separately subjected to preamplification, amplification and integration to produce D. C. potentials which vary as the radiation detected by the respective detectors, and these potentials are recorded, say as traces of amplitude against time. As long as the energy distribution of the gamma radiation detected from point to point along the traverse is the same, the traces will have the same shape, but if the energy distribution changes, the change will be apparent through a difference in the shapes of the traces. The information thus obtained is useful, for example in logging a bore hole, by revealing geophysical differences between formations that may not appear as differences in intensity of gamma radiation from one geological formation to another.

It is known that a number of types of radiation detectors manifest different efficiencies for the detection of gamma rays at different energy levels, and it is quite practical to construct two counters, one of which, for example, has an efficiency of ½% for gamma radiation of ½ mev. and an efficiency of 2% for gamma radiation of 3 mev.; while the other has an efficiency of 1% at the ½ mev. level and an efficiency of 5% at the 3 mev. level. Thus, as illustrated by Fig. 8, a plot of the efficiency of counter type detectors of different metals against energy of gamma radiation detected gives curves of different slopes and shapes. This applies both to detectors of the Geiger-Mueller type having a tubular cathode around an anode wire and to more efficient detectors for gamma radiation such as the multiple cathode type described and claimed in U. S. Patents Nos. 2,397,071 and 2,397,072, granted March 19, 1946. For practical purposes, the anodes of the counters may be made of any suitable metal, say tungsten, for the variation in counter efficiency at various energy levels is primarily dependent upon the metal of the cathode. When reference is made herein to a "copper" detector, a "lead" detector etc., it indicates that the cathode, but not necessarily the anode, is made of such metal.

Fig. 8 shows that the gamma ray detection efficiency of a lead counter or detector rises to a node at about 0.5 mev., drops to an antinode at about 1.0 mev. and then increases as the energy level of the gamma radiation increases. A brass counter has a lower efficiency than a lead counter for gamma radiation of relatively low energy, say 0.5 mev. But the efficiency of the brass counter increases gradually as the energy level is raised, resulting in a curve having different slope and amplitude than that for lead. An aluminum counter gives a still different curve which is much lower than that for lead at the left but is higher than that for lead at the high energies toward the right.

By efficiency is meant the number of gamma rays on the average detected by the counter out of the total entering its active volume. Thus a Geiger-Mueller counter which detects on the average one gamma ray out of each 200 that enter has an efficiency of ½%, whereas a multiple-plate type counter that detects on the average one gamma ray out of each 20 that enter has an efficiency of 5%. The gamma radiation emitted by earth and earth samples and which must be detected in the practice of the present invention generally has a very low intensity. Consequently detectors of relatively high efficiency in the entire range of energy levels to be investigated should be employed, and in addition the efficiencies of the counters at various energy levels should be different.

If two monochromatic gamma ray beams of different energies are first measured separately with a lead counter and then with an aluminum counter, the four responses obtained will show that the energies, i. e. the wave lengths, of the two beams are different. If the first source has an energy of 0.5 mev. the responses of the aluminum counter and the lead counter at this energy level will be in the ratio of the amplitude AL1 to the amplitude PB1 on Fig. 8, i. e. the response of the lead counter will be about 5 times greater than the response of the aluminum counter. If the second source has an energy of 2 mev., the ratio of the responses of the two counters will be very different. The aluminum counter will respond with an amplitude AL2 and the lead counter will respond with an amplitude PB2. Thus the response of the lead counter will be only about 0.9 times the response of the aluminum counter.

If two gamma ray beams of different intensity but with the same spectra (energy distribution) are measured with the lead counter and the aluminum counter as described above, the ratio AL1/PB1 will be the same as the ratio AL2/PB2 thus revealing the fact that the spectra are the same in the two cases, this being true whether the beams are "monochromatic" or "polychromatic." In short, the two detectors which have different sensitivity distribution with respect to wave length (energy) of gamma rays may be employed to detect differences in the energy distribution of different gamma ray beams emitted respectively by two different rock formations or rock samples.

The application of such detectors in an airborne survey is illustrated in Fig. 7.

An aluminum detector 71 and a lead detector 72 (preferably of the multiple cathode type) are mounted adjacent each other in an aircraft 73 which is flown along a line above an earth surface 74 from which gamma radiation is emitted. The detectors are energized by a conventional high voltage power supply 75, and the output of each detector is separately subjected to amplification and preferably also integrated in conventional electronic amplifiers 76, 77. The amplified responses of the two detectors, in the form of variable D. C. potentials are sent respectively to conventional recorders 78, 79, say recording oscillographs, which produce the respective traces 80, 81 on a common record 82. Each of these traces varies as the detected intensities of gamma radiation from the earth, and may be employed to disclose gamma ray anomalies associated with geological features and buried mineral deposits as disclosed and claimed in my aforementioned co-pending application Serial No. 18,842, filed March 9, 1948. As long as the spectra of the gamma radiation emitted by the earth along the line of flight remain the same, the ratio of the amplitudes of the two traces 80, 81 will be constant, but any change in energy distribution in the detected gamma rays will be manifested by a change in this ratio, which will be apparent by difference in shape of the curves. However, a change in the ratio may be detected automatically by employing a ratio circuit 83, say an electronic bridge, into which the amplifier outputs are fed and automatically compared produce a D. C. potential indicative of a change in the pertinent ratio. This D. C. potential is sent to a third conventional recorder 84, which produces a trace 85 on the common record. This trace is indicative of changes in gamma ray spectrum along the course of the survey and peaks of this trace may reveal mineral deposits, faults, contacts, gradual changes within a given formation, and other pertinent geological information that otherwise would not be available.

The apparatus of Fig. 7 can also be employed to make surveys along the ground or underground in shafts, tunnels, etc.

Fig. 9 illustrates the application of the invention to well logging. A vertical bore hole 90 in the earth, for example an oil well, is logged by pulling a logging head 91 up along the bore. The logging head contains a lead gamma radiation detector 92 and an aluminum gamma radiation detector 93. The two detectors are mounted side by side at substantially the same elevation and preferably are of the multiple plate type of U. S. Patent No. 2,397,071. The two detectors are energized by a high voltage power supply 94 through individual electronic preamplifiers 95, 96 of conventional design. For purposes of simplicity, the outputs of the preamplifiers are shown as conducted by separate leads through a logging cable 97 to the surface. However, in practice a mono-conductor cable may be employed with means for separating the respective pulses from the two preamplifiers at the surface. Thus the pulses from the two detectors may be unscrambled as described in co-pending application Serial No. 584,164, filed March 22, 1945, by Gerhard Herzog, now Patent No. 2,481,014. In any case, the pulses are individually amplified further by amplifiers 98, 99 at the surface. The outputs of these amplifiers are impressed respectively across potentiometers 100, 101, the sliders of which connect respectively to integrating circuits 102, 103 which are conventional R-C combinations that average the D. C. pulses received over a time period dependent upon the ratio of resistance to capacitance of the circuit. Either the resistance or the condenser of an integrating circuit may be made variable so as to adjust the time constant.

The outputs of the two integrating circuits are subtracted from each other in an electronic bridge of known design in which two triodes 104, 105 are the principal elements, the outputs of the two integrating circuits being connected respectively to the control grids of these tubes. The cathodes of the two triodes are connected to the negative side of a bridge circuit voltage supply 106 through a common resistor 107 and two cathode resistors 108, 109. The plates of the two tubes are connected respectively through resistances 110, 111 to the ends of a potentiometer 112, the slider of which connects to the positive side of the voltage supply for the bridge circuit. A recorder 113, say a recording milliammeter, is connected between the two plates.

The electronic bridge circuit is so designed that with no voltage applied to either control grid a condition of electrical balance is attained with no potential difference between the two plates. This null condition, as indicated by the recorder 113, may be attained by adjusting the slider of the potentiometer 112.

A potential applied to either grid will upset balance by changing the magnitude of plate current in the two tubes in opposite directions, resulting in a deflection of the recorder. The direction of deflection depends on the sign of the potential applied.

The grid of one tube is controlled by the aluminum detector. The grid of the other tube is controlled by the lead counter. If the potentials applied to the two grids have the same sign (either plus or minus) each tube tends to move the recorder in a direction opposed by the other. The resulting deflection is proportional to the difference in the magnitude of the two potentials applied. In other words, the net deflection is indicative of a change in the spectra of gamma radiation encountered from location to location along the bore hole.

The recorder 113 produces on a moving record 114 a trace 115 which shows the changes in spectra. The speed of record movement is correlated with that of the logging head by conventional means such as gearing (not shown), so that the trace is a plot of depth in the bore hole against changes in gamma spectra along the bore hole.

Side by side with the trace 115 is a second trace 116 produced by another recorder 117 that registers the integrated output of the amplifier 98, since it is connected to the output of the integrating circuit 102. The trace 116 is representative of intensities detected by the lead detector alone and is therefore a conventional gamma ray log of intensity against depth in the bore hole. The "spectrum" log 115 is useful by itself in correlation of strata between wells, but the "intensity" log 116 is also useful, and the data obtainable from both logs frequently permits interpretations which could not otherwise be made.

By adjusting the setting of the two potentiometers 100, 101, the contribution of the two detectors to the subtractive operation in the bridge may be regulated to produce optimum results in the form of the "spectrum" trace.

I claim:

1. In geophysical prospecting apparatus, the combination which comprises two gamma ray detectors, one of which has a different detection efficiency than the other for gamma rays of one energy and a still different detection efficiency with respect to the other for gamma rays of a second energy the two detectors being disposed close together, and means for comparing the gamma ray response of one detector to the gamma ray response of the other.

2. In geophysical prospecting apparatus, the combination which comprises two gamma ray detectors disposed close together, one of the detectors having a different detection efficiency than the other for gamma rays of one energy and a still different detection efficiency with respect to the other for gamma rays of a second energy, and means for electrically subtracting the gamma ray response of one detector from the gamma ray response of the other detector.

3. In geophyical prospecting apparatus, the combination which comprises two gamma ray detectors, one of which has a different detection efficiency than the other for gamma rays of one energy and a still different detection efficiency with respect to the other for gamma rays of a escond energy the two detectors being disposed close together, means for electrically subtracting the gamma ray response of one detector from the gamma ray response of the other detector and indicating the result, and means for indicating the separate response of at least one of the detectors.

4. In a geophyical examination involving the detection of gamma radiation emitted from earth, the improvement which comprises simultaneously measuring the intensity of such radiation from a substantially common origin in the earth with two detectors disposed close together, one of the detectors having a different detection efficiency than the other for gamma rays of one energy and a still different detection efficiency with respect to the other for gamma rays of a second energy.

GERHARD HERZOG.

(References on following page)

REFERENCES CITED

The following references are of record in the file of this patent:

UNITED STATES PATENTS

| Number | Name | Date |
|---|---|---|
| 2,285,840 | Scherbatskoy | June 9, 1942 |
| 2,349,753 | Pontecorvo | May 23, 1944 |
| 2,445,305 | Hochgesang | July 13, 1948 |
| 2,499,489 | Goldstein et al. | Mar. 7, 1950 |

OTHER REFERENCES

Atomic Energy Commission Publication, AECD, 2399, December 15, 1947, pp. 1–6.

Heiland, Geophysical Exploration, Prentice-Hall, 1940, pp. 873–878, 884 and 885.

Richtmeyer and Kennard, Introduction to Modern Physics, McGraw-Hill, 1948, pp. 565–567.